US008833085B2

United States Patent
Snider et al.

(10) Patent No.: US 8,833,085 B2
(45) Date of Patent: Sep. 16, 2014

(54) SYSTEM AND METHOD FOR GAS TURBINE STARTUP CONTROL

(75) Inventors: David August Snider, Simpsonville, SC (US); Randy Scott Rosson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1163 days.

(21) Appl. No.: 12/694,334

(22) Filed: Jan. 27, 2010

(65) Prior Publication Data
US 2011/0179802 A1 Jul. 28, 2011

(51) Int. Cl.
*F02C 7/26* (2006.01)
*F02C 7/268* (2006.01)
*F02C 7/275* (2006.01)

(52) U.S. Cl.
CPC ............... *F02C 7/26* (2013.01); *F05D 2260/85* (2013.01); *F05D 2270/304* (2013.01)
USPC .................... 60/778; 60/786; 60/787; 60/788

(58) Field of Classification Search
USPC ............................................ 60/778, 786–788
See application file for complete search history.

(56) References Cited

U.S. PATENT DOCUMENTS

| 5,241,817 A | * | 9/1993 | George, Jr. ................. 60/39.182 |
| 5,718,111 A | | 2/1998 | Ling et al. |
| 6,163,137 A | * | 12/2000 | Wallace et al. ................. 322/20 |
| 6,321,526 B1 | | 11/2001 | Hamana |
| 6,988,368 B2 | | 1/2006 | O'Connor |

FOREIGN PATENT DOCUMENTS

JP 5098996 4/1993
JP 2009296853 A * 12/2009

OTHER PUBLICATIONS

English Translation (by computer) of Yamagami et al. JP 2009296853A.*
English Abstract of JP 5098996, published Apr. 20, 1993.

* cited by examiner

*Primary Examiner* — Phutthiwat Wongwian
*Assistant Examiner* — Arun Goyal
(74) *Attorney, Agent, or Firm* — Dority & Manning, PA

(57) ABSTRACT

A system and method for startup control of a gas turbine is disclosed. The system and method includes defining a target startup time for the startup of the gas turbine and determining a remaining time to achieve the target startup time. The system and method includes monitoring at least one parameter associated with the startup and determining a first operating point for the parameter. The system and method adjusts the first operating point for the parameter to a second operating point based at least in part on the remaining time for the startup. The system and method controls an effector based on the second operating point for the parameter.

16 Claims, 5 Drawing Sheets

SYSTEM AND METHOD FOR GAS TURBINE STARTUP CONTROL

FIELD OF THE INVENTION

The present invention relates generally to gas turbines and, more particularly, to systems and methods for startup control of gas turbines.

BACKGROUND OF THE INVENTION

Existing systems and methods for gas turbine startup control are based on defined schedules related to various startup parameters such as, for example, minimum/maximum fuel flow, acceleration rate, starting torque, and other suitable parameters. The predefined schedules define startup characteristics for the gas turbine. Startup parameters are controlled to follow nominal paths set forth in the schedules. However, in practice, the gas turbine startup can deviate from the nominal paths set forth in the schedules due to variations in for example, ambient temperature or component performance. These deviations may not be corrected during startup and can result in significant variation in startup time for the gas turbine. This in turn can impact component life, blade tip clearances, and performance of the gas turbine.

One approach to addressing variations in startup is to allow for large margins in the startup time. However, such an approach may not always be desirable due to predictability and efficiency concerns. Moreover, guarantees of startup times for gas turbines are becoming more common commercial requirements.

Another approach that can be used to address variations in gas turbine startup is the application of a target tracking schedule. In this approach, gas turbine speed or other suitable startup parameter is monitored versus time. The control routine determines if there are any errors in gas turbine speed or other suitable parameter and controls various effectors, such as fuel flow and starting torque, to correct any errors.

However, given that gas turbine speed is a slow responding characteristic, once an error has developed, the controls may quickly saturate against established limits in an attempt to close the error. Sustained operation at control limits, such as for example, at a maximum firing or exhaust temperature, is typically not desirable. Additionally, when the error is close to zero, the lack of sensitivity can result in control loops moving quickly from one boundary to the other, creating wear and other hardware issues.

Thus, an improved gas turbine startup control system and method that provides for guaranteed startup times with reduced margins that overcome the above-mentioned disadvantages would be welcome in the art.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a method for controlling startup of a gas turbine. The method includes defining a target startup time to achieve an operating speed for the gas turbine and determining a remaining time to achieve the target startup time. The method includes monitoring at least one parameter associated with the startup. The method determines a first operating point for the parameter and adjusts the first operating point for the parameter to a second operating point based at least in part on the remaining time for the startup. The method controls an effector based on the second operating point for the parameter.

Another exemplary embodiment of the present disclosure is directed to a system for controlling startup of a gas turbine. The system includes a monitoring system configured to monitor a parameter for the gas turbine startup and to provide a feedback signal associated with the parameter. The system further includes a control system configured to determine a remaining time for the startup of the gas turbine to achieve a target startup time. The control system is configured to determine a first operating point for the parameter and to adjust the first operating point for the parameter to a second operating point based on the remaining time for the startup. The control system is configured to provide an error signal based at least in part on the feedback signal and the second operating point for the parameter and is configured to control an effector based on the error signal.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
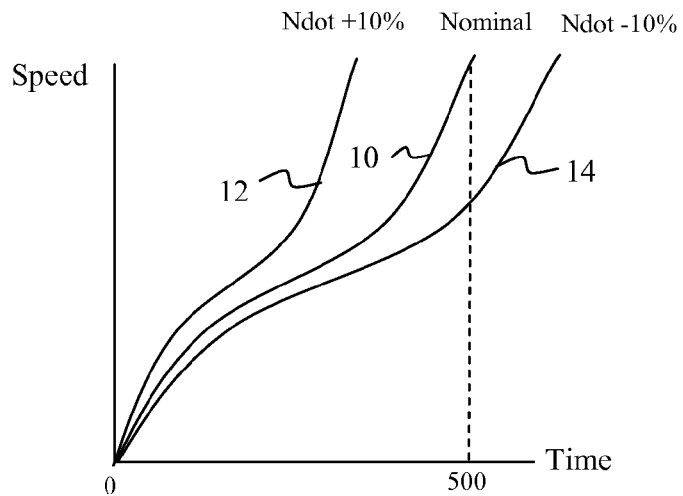
FIG. 1 provides a graphical representation of exemplary acceleration trajectories that can be used in accordance with exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a system and method for improved startup control. While the present disclosure is made with reference to gas turbines, those of ordinary skill in the art, using the disclosures provided herein, should understand that the present invention is not limited startup control for gas turbines and is equally applicable to other technologies. Embodiments of the present disclosure use trajectory scheduling to significantly reduce variation in startup time, without introducing control response and stability issues. Parameters associated with startup control are used with current state of the startup information to make real time adjustments to control schedules to achieve a predefined target start time.

Adjustments to the control schedules can be made with interpolation tables or other functions that do not require the use of additional control loops. Embodiments of the present disclosure can be implemented with relatively minor additions to the existing startup control structure for a gas turbine or other device. Because adjustments to startup parameters are made with consideration of the cumulative effect at the end of startup, the control adjustments are reduced.

The trajectory control methods and systems of the present disclosure make adjustments to control schedules based on remaining time to achieve a target startup time. The target startup time is a time target for the gas turbine or other device to achieve a predefined operating speed, such as 100% speed or full speed for a gas turbine. The target startup time can be predefined according to customer specifications or other requirements. Remaining time to achieve the target startup time can be determined or calculated by monitoring elapsed startup time.

In embodiments of the present disclosure, multiple startups are modeled with variations in the schedules to develop a family of startup characteristics. These characteristics can be plotted versus remaining time to define a number of trajectories available to complete the startup (i.e. achieve a predefined operating speed) at the target startup time from any point during the startup. Based on the current speed and the remaining time to complete the startup, appropriate adjustments can be made to the existing schedules to provide the required trajectories.

For example, FIG. 1 illustrates multiple acceleration trajectories 10, 12, and 14 for a gas turbine startup plotted as speed versus time. Acceleration trajectory 10 is representative of a nominal acceleration schedule, while acceleration trajectories 12 and 14 represent ±10% deviations from the nominal acceleration schedule respectively. While only three trajectories are illustrated in FIG. 1, those of ordinary skill in the art, using the disclosures provided herein, should understand that any number of acceleration trajectories can be provided without deviating from the scope of the present disclosure. The multiple acceleration trajectories 10, 12, and 14 provided in FIG. 1 are used to determine adjustments to existing schedules based on remaining time to achieve a predefined operating speed by the target startup time.

Figure 2:
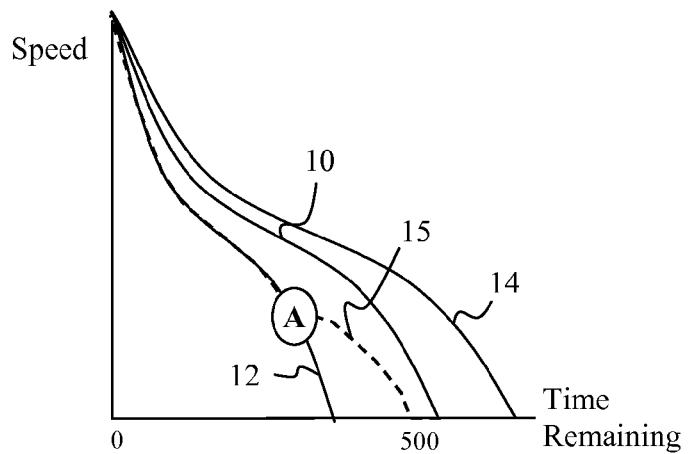
FIG. 2 provides a graphical representation of exemplary acceleration trajectories plotted as a function of remaining time to achieve a predefined operating speed in accordance with exemplary embodiments of the present disclosure.
Figure 3:
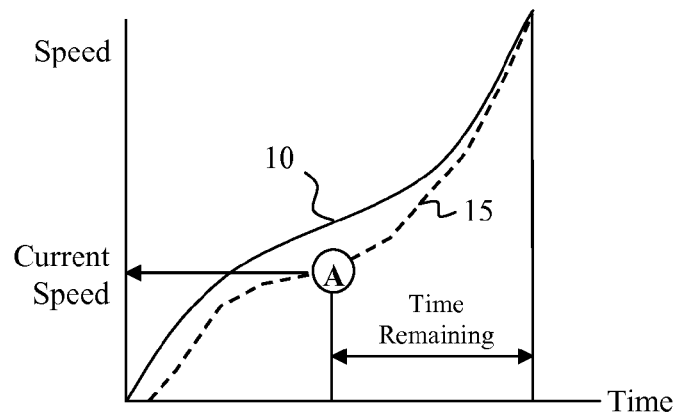
FIG. 3 provides a graphical representation of an exemplary startup for a gas turbine according to an exemplary embodiment of the present disclosure.

FIG. 2 plots acceleration trajectories 10, 12, 14 of FIG. 1 as trajectories from a predefined operating speed, such as 100% speed, as a function of remaining time. The dashed line 15 in FIG. 2 and FIG. 3 illustrates an example startup. Prior to point "A," the acceleration of the gas turbine lags the nominal acceleration schedule. This can be due to, for instance, slow initiation of starting torque and/or the gas turbine accelerating slowly on reduced fuel.

At point "A," the remaining time to achieve the target startup time and the current gas turbine speed are determined. Based on remaining time and current speed, adjustments to the acceleration schedule are provided so that the gas turbine achieves a predefined operating speed by the target startup time. For example, as shown in FIGS. 2 and 3, the appropriate trajectory to achieve the predefined operating speed of about 100% speed at the target startup time is based on the +10% acceleration trajectory 12. The control system and method controls various effectors, such as fuel flow, turbine firing, and/or starting torque provided to the gas turbine, based on the adjusted acceleration schedule so that the gas turbine can achieve the predefined operating speed at the target startup time.

Adjustments to the schedules can be performed continuously and multiple startup schedules can be adjusted at the same time. For instance, the starting torque and fuel flow can be adjusted to optimally control the gas turbine acceleration without stability issues. Moreover, because adjustments are determined from interpolation tables or as functions of remaining time, no additional control loops are required.

Figure 4:
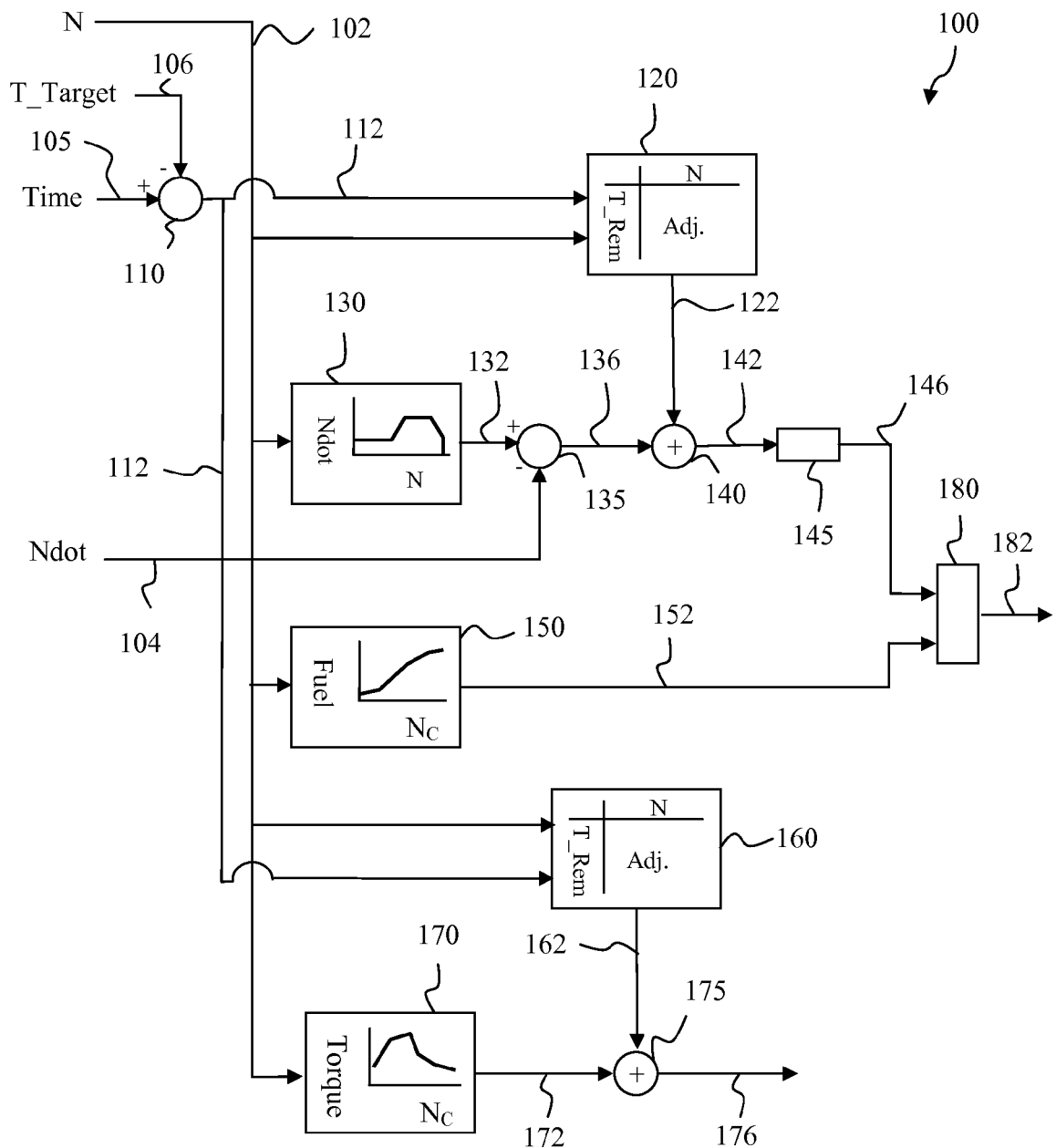
FIG. 4 provides an exemplary control topology for a control system according to an exemplary embodiment of the present disclosure.

With reference now to FIG. 4, an exemplary control system 100 according to an exemplary embodiment of the present disclosure will now be discussed in detail. Control system 100 monitors various parameters associated with the startup of a gas turbine. For instance, as illustrated, gas turbine speed N is monitored by a monitoring system and a speed signal 102 is provided as an input to control system 100. Gas turbine acceleration Ndot is also monitored and an acceleration input signal 104 is also provided as an input to control system 100. While control system 100 monitors speed N and acceleration Ndot as operating parameters associated with gas turbine startup, those of ordinary skill in the art, using the disclosure provided herein, should understand that the present subject matter is equally applicable to other startup parameters, such as fuel flow, exhaust temperature, turbine firing and other suitable operating parameters.

Speed signal 102 and acceleration input signal 104 are used by control system 100 to determine control outputs for controlling various effectors. For example, control system 100 provides fuel output control signal 182 to control the fuel flow supplied to the gas turbine during startup. Additionally, control system 100 provides a torque output control signal 176 to control the amount of starting torque provided to the gas turbine. While control system 100 is discussed with respect to controlling effectors directed to fuel flow and starting torque, those of ordinary skill in the art, using the disclosures provided herein, should understand that the present subject matter is equally applicable to other suitable effectors for adjusting startup characteristics of a gas turbine.

Speed signal 102 is provided to a plurality of startup schedules, including an acceleration schedule 130, a minimum fuel schedule 150, and a starting torque schedule 170. Acceleration schedule 130, minimum fuel schedule 150, and starting torque schedule 170 are used by control system 100 to determine a first operating point for a startup parameter. For example, acceleration schedule 130 is used to determine a first operating point for gas turbine acceleration based on the current speed N of the gas turbine. Control system 100 provides a first acceleration control signal 132 based on the operating point set forth in acceleration schedule 130.

Similarly, minimum fuel schedule 150 is used to determine an operating point for minimum fuel flow to the gas turbine based on the current speed N of the gas turbine. Control system 100 provides a minimum fuel signal 152 based on the operating point set forth in minimum fuel schedule 150. Starting torque schedule 170 is used to determine a first operating point for starting torque based on the current speed N of the gas turbine. Control system 100 provides a first starting torque signal 172 based on the operating point set forth in the starting torque schedule 170.

Acceleration schedule 130, minimum fuel schedule 150, and starting torque schedule 170 are based on nominal paths for startup of the gas turbine. Due to various operating conditions, gas turbine startup may deviate from the nominal paths set forth in acceleration schedule 130, minimum fuel schedule 150, and starting torque 170. In accordance with embodiments of the present disclosure, control system 100 is configured to make adjustments to the operating points set forth in the startup schedules, such as acceleration schedule 130 and starting torque schedule 170, to address deviations in gas turbine startup so that the gas turbine can achieve a predefined operating speed by a predefined target startup time.

Control system 100 makes adjustments to the operating points provided by acceleration schedule 130 and starting torque schedule 170 by first determining a remaining time for the gas turbine to achieve a target startup time. The target startup time is predefined by a user or other operator of the control system to conform to customer specifications or other suitable requirements. The target startup time is provided to control system 100 as a T_Target signal 106.

In particular, T_Target signal 106 representative of the target startup time is provided to control device 110. Control device 110 also receives a Time signal 105 representative of elapsed time. Control device 110 is configured to provide a time remaining signal 112 representative of remaining time based on the T_Target signal 106 and Time signal 105. Control device 110 can be a summer or other control device configured to provide time remaining signal 112 based on T_Target signal 106 and Time signal 105.

Control system 100 is configured to adjust the operating points set forth in startup schedules, such as acceleration schedule 130 and starting torque schedule 170, based on the time remaining signal 112. The operating points set forth in the startup schedules are adjusted based on trajectory schedules. As discussed above, the trajectory schedules are developed by modeling multiple startups with variations in the schedules to develop a family of startup characteristics. The development of the schedules can address varying levels of authority, or implied boundaries. For instance, to provide for increased stability at low speeds, the trajectory schedules can favor starting torque changes over changes in other startup parameters, such as acceleration, fuel flow, turbine firing, exhaust temperature, or other suitable startup parameters. These characteristics can be provided versus remaining time to define a number of trajectories available to complete the startup at the target startup time from any point during the startup.

In one exemplary embodiment, the trajectory schedule can include an interpolation table that provides adjustment values to adjust the operating points set forth in the startup schedules based on remaining time and current turbine speed. In other embodiments, the adjustment values can be determined as a function of remaining time and current turbine speed. The adjustment values are defined based on the plurality of trajectories for achieving a predefined operating speed by the target startup time. Because adjustments can be determined from interpolation tables or as functions of remaining time, no additional control loops are required.

Referring to FIG. 4, time remaining signal 112 and speed signal 102 are provided to acceleration trajectory schedule 120. Acceleration adjustment signal 122 is determined from acceleration trajectory schedule 120 based on time remaining signal 112 and speed signal 102. Acceleration adjustment signal 122 is provided to control device 140.

Control device 140 receives a first error signal 136 from control device 135. Control device 135 is configured to determine first error signal 136 based on acceleration control signal 132 and the acceleration input signal 104. Control device 135 can be a summer or other suitable device for determining error between acceleration control signal 132 and acceleration input signal 104.

Control device 140 sums the acceleration adjustment signal 122 with first error signal 136 to provide acceleration control signal 142 representative of a second operating point for acceleration of the gas turbine. In this manner, control system 100 adjusts the first operating point set forth in acceleration schedule 130 to a second operating point based on remaining time to achieve predefined operating speed by the target startup time. As illustrated in FIG. 4, adjustment to the acceleration operating point set forth in the acceleration trajectory schedule 120 can be can be implemented with a relatively minor addition to the typical startup control structure for a gas turbine.

Control system 100 is configured to control an effector, such as fuel flow or starting torque, based on the second operating point for the startup parameter. For example, acceleration control signal 142 is provided to regulator 145 which generates fuel flow command signal 146 based on acceleration control signal 142. Regulator 145 can be a proportional regulator, proportional integral regulator, proportional derivative regulator, proportional integral derivative regulator, or other suitable regulator.

Fuel flow command signal 146 is compared with minimum fuel flow signal 152 at control device 180. Control device 180 determines the greater value between fuel flow command signal 146 and minimum fuel flow signal 152. Control device 180 outputs the greater of fuel flow command signal 146 and minimum fuel flow signal 152 as fuel output control signal 182. In this manner, control system 100 controls an effector, namely fuel flow, based on the second operating point for acceleration.

Similarly, time remaining signal 112 and speed signal 102 are provided to starting torque trajectory schedule 160. Starting torque adjustment signal 162 is determined from starting torque trajectory schedule 160 based on time remaining signal 112 and speed signal 102. Starting torque adjustment signal 162 is provided to control device 175. Control device 175 adds the value of starting torque adjustment signal 162 to first starting torque control signal 172 and provides a starting torque output control signal 176. Control system 100 controls starting torque applied to the gas turbine based on starting torque output control signal 176. In this manner, control system 100 controls an effector, namely starting torque, based on the second operating point for starting torque.

Figure 5:
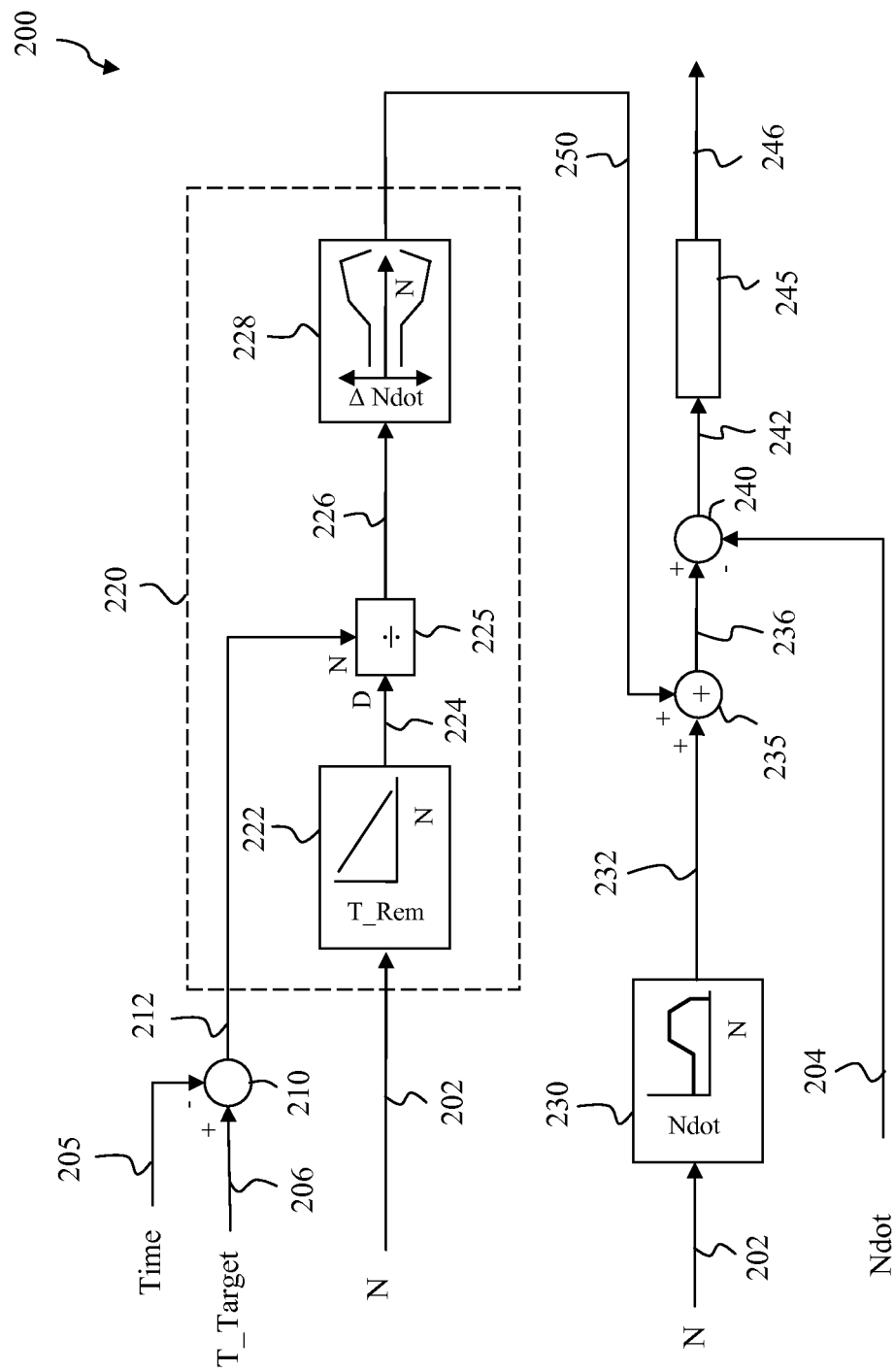
FIG. 5 provides an exemplary control topology for a control system according to an exemplary embodiment of the present disclosure.

Referring to FIG. 5, another exemplary embodiment of the present disclosure will now be discussed in detail. FIG. 5 depicts a control system 200 that receives speed signal 202 and acceleration signal 204 as input signals. Control system 200 is configured to provide a fuel flow output control signal 246 to control an effector, namely fuel flow, to achieve predefined operating speed for the gas turbine by a target startup time.

Control system 200 receives T_Target signal 206 representative of the predefined target startup time for the gas turbine and Time signal 205 representative of the elapsed time for the startup. T_Target signal 206 and Time signal 205 are provided to control device 210 which determines a time remaining signal 212 based on the T_Target signal 206 and Time signal 205. Control device 210 can be a summer or other suitable device for determining time remaining signal 212 from T_Target signal 206 and Time signal 205.

Time remaining signal 212 and speed signal 202 are both provided to acceleration trajectory schedule 220. The control logic for acceleration trajectory schedule 220 will now be discussed in detail. Speed input signal 202 is provided to a remaining time startup schedule 222 that plots ideal remaining time versus speed for the gas turbine based on a target trajectory for gas turbine acceleration. An ideal remaining time signal 224 is determined from remaining time startup schedule 222. Ideal remaining time signal 224 and time remaining signal 212 are provided to control device 225. Control device 225 divides the time remaining signal 212 by the ideal remaining time signal 224 to provide a remaining time ratio signal 226.

Figure 6:
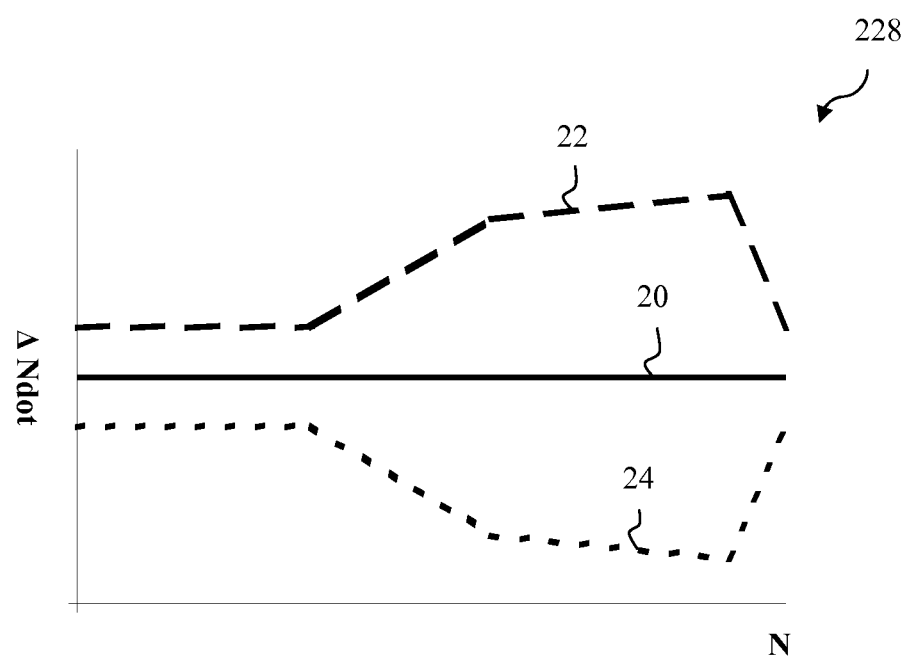
FIG. 6 provides an exemplary trajectory adjustment schedule according to an exemplary embodiment of the present invention.

Remaining time ratio signal 226 is provided to trajectory adjustment schedule 228. An exemplary trajectory adjustment schedule 228 is illustrated in FIG. 6. Trajectory adjustment schedule 228 plots acceleration adjustment values Δ Ndot as a function of speed. The appropriate acceleration adjustment value can be determined by following the trajectory curve associated with the appropriate remaining time ratio signal 226 provided to trajectory adjustment schedule 228.

For instance, referring to FIG. 6, an exemplary trajectory adjustment schedule 228 includes three trajectory curves 20, 22, and 24. Trajectory curve 20 can be associated with a remaining time ratio of about 1. Trajectory curve 22 can be associated with a remaining time ratio of about 0. Trajectory curve 24 can be associated with a remaining time ratio of about 2. Adjustment values Δ Ndot associated with remaining time ratios that are not exactly equal to 0, 1, or 2 can be determined through interpolation or other suitable methods.

Based on curve 20, if the remaining time ratio is approximately 1 (i.e. the remaining time signal and the ideal remaining time signal are approximately equal), no adjustments are required, resulting in an acceleration adjustment value Δ Ndot of about 0. Based on curve 22, if the remaining time ratio is approximately 0 or between 0 and 1 (i.e. the remaining time signal lags the ideal remaining time signal), an appropriate adjustment value Δ Ndot determined from curve 22 is provided to make the appropriate adjustment in acceleration of the gas turbine. As illustrated in FIG. 6, the value of adjustment value Δ Ndot depends on the current speed of the gas turbine. Similarly based on curve 24, if the remaining time ratio is approximately 2 or between 1 and 2 (i.e. the remaining time signal leads the ideal remaining time signal), an appropriate adjustment value Δ Ndot determined from curve 24 is provided to make the appropriate adjustment in acceleration of the gas turbine. The value of adjustment value Δ Ndot depends on the current speed of the gas turbine.

Referring back to FIG. 5, adjustment value signal 250, representative of the appropriate adjustment value determined from trajectory adjustment schedule 228, is provided to control device 235. Control system 200 uses adjustment value signal 250 to make adjustments to operating points set forth in acceleration startup schedule 230. In particular, speed input signal 202 is provided to acceleration startup schedule 230. A first operating point is determined from the acceleration startup schedule 230 and is provided as first acceleration control signal 232. First acceleration control signal 232 is provided to control device 235 which sums adjustment value signal 250 with first acceleration control signal 232 to provide second acceleration control signal 236. Control device 235 can be a summer or other suitable control device for providing second acceleration control signal 236 from first acceleration control signal 232 and adjustment value signal 250.

Control system 200 is configured to control an effector, such as fuel flow or starting torque, based on the second acceleration control signal 236. For example, second acceleration control signal 236 is provided to control device 240 along with acceleration input signal 204. Control device 240 determines an error signal 242 based on the second acceleration control signal 236 and the acceleration input signal 204. Control device 240 can be a summer or other suitable device for determining error between second acceleration control signal 236 and acceleration input signal 204. Error signal 242 is provided to regulator 245 which generates fuel flow output control signal 246 based on error signal 242. Regulator 245 can be a proportional regulator, proportional integral regulator, proportional derivative regulator, proportional integral derivative regulator, or other suitable regulator. Fuel flow output control signal 246 is used to control fuel flow to achieve predefined operating speed for the gas turbine by a target startup time.

Figure 7:
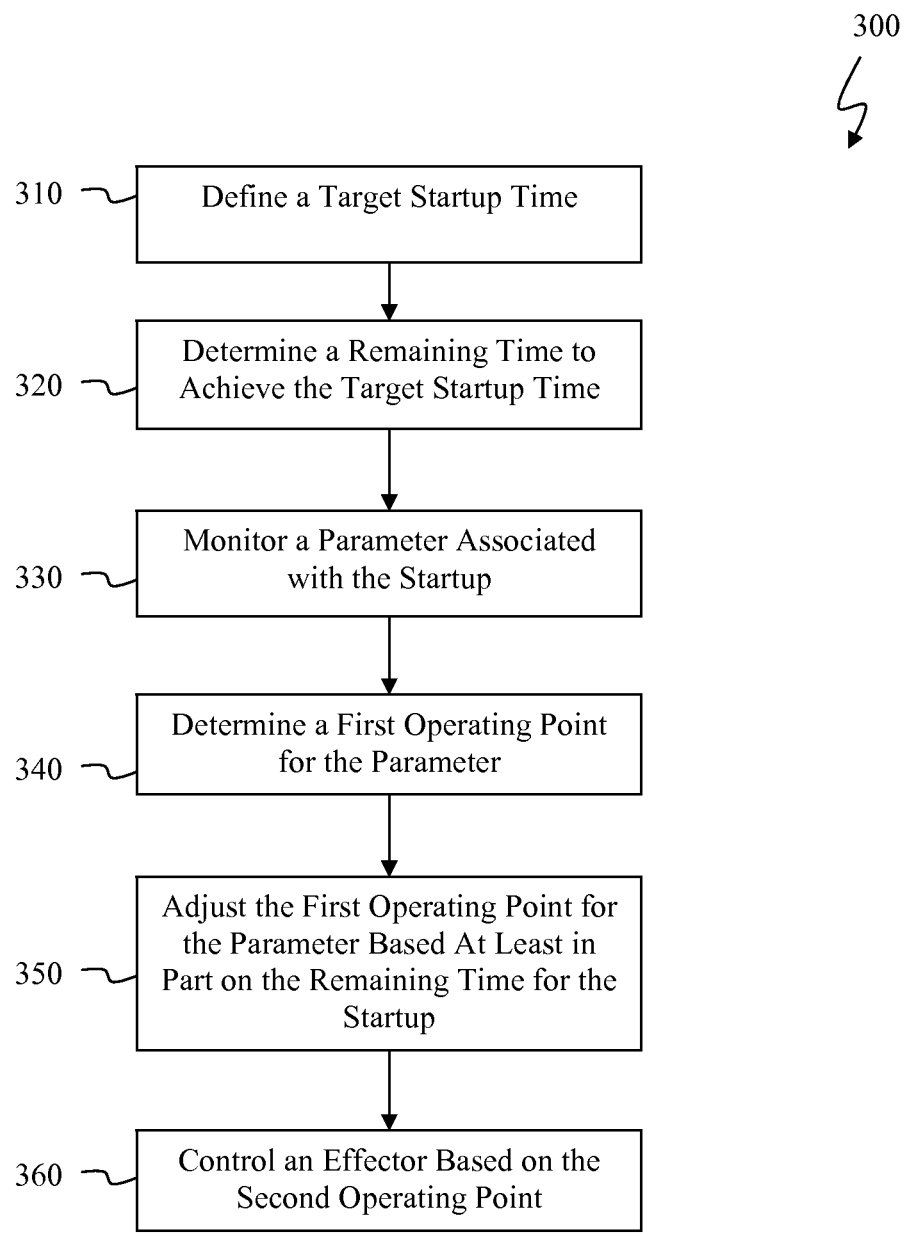
FIG. 7 provides a flow diagram of a method according to an exemplary embodiment of the present disclosure.

With reference to FIG. 7, a flow diagram for a method 300 according to an exemplary embodiment of the present disclosure will now be discussed in detail. At 310, the method defines a target startup time. The target startup time is the desired time by which the gas turbine is to achieve predefined operating speed. The target startup time can be defined based on customer specifications or other requirements.

At 320, the method 300 determines a remaining time to achieve the target startup time. The remaining time is used by method 300 to make adjustments to operating points for various startup parameters. The remaining time can be determined by monitoring the elapsed time and initial startup time for the startup. For example, the remaining time can be determined by subtracting the elapsed time from the target startup time.

At 330, the method 300 monitors a parameter associated with the startup. For instance, the method can monitor gas turbine speed, acceleration, starting torque, fuel flow, exhaust temperature, turbine firing, or other suitable parameter associated with the startup. At 340, the method 300 determines a first operating point for the parameter. The first operating point can be determined from predefined startup schedules based on a nominal path for the startup parameter.

At 350, the method 300 adjusts the first operating point for the parameter to a second operating point based at least in part on the remaining time for the startup. For example, the method 300 can provide an adjustment value to the first operating point for the parameter to adjust the first operating point to the second operating point. At 360, the method controls an effector, such as fuel flow, starting torque, turbine firing, or other suitable effector based on the second operating point. In this manner, the method 300 uses current state of the startup information to make real time adjustments to control schedules to achieve a predefined target start time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for starting a gas turbine, comprising:
selecting a nominal acceleration trajectory curve from a startup acceleration trajectory schedule which defines the nominal acceleration trajectory curve and a plurality of acceleration trajectory curves which deviate from the nominal acceleration trajectory curve for achieving a desired operating speed of the gas turbine at a predefined target time, wherein the acceleration trajectory curves from the startup acceleration trajectory schedule range from speed zero to a target speed;
applying a startup torque to the gas turbine;
determining a current speed of the gas turbine, wherein the current speed is taken at a time which occurs prior to the target startup time;
determining time remaining until the target startup time is to be achieved based on the time at which the current speed was determined;
comparing the current speed and time remaining with the nominal acceleration trajectory curve; and
wherein if the current speed and time remaining deviate from the nominal acceleration trajectory curve the method further comprises modifying at least one effector of the gas turbine which results in the gas turbine following one of the acceleration trajectory curves which deviate from the nominal acceleration trajectory curve to achieve the desired operating speed at the predefined target time.

2. The method as in claim 1, further comprising continuously determining current speed of the gas turbine, time remaining until target startup time and comparing current speed and time remaining with the nominal acceleration trajectory curve and the plurality of acceleration trajectory curves which deviate from the nominal acceleration trajectory curve.

3. The method as in claim 2, wherein if the current speed and time remaining deviate from a currently chosen acceleration trajectory curve, the method further comprising modifying at least one effector of the gas turbine which results in the gas turbine following a different acceleration trajectory curve to achieve the desired operating speed at the predefined target time.

4. The method as in claim 1, wherein the effector is at least one of fuel flow or starting torque.

5. The method as in claim 1, further comprising monitoring a parameter associated with the startup of the gas turbine and determining a first operating point for the parameter, wherein the parameter is one of fuel flow, exhaust temperature or turbine firing.

6. The method as in claim 5, wherein the first operating point for the parameter is determined based in part from a nominal acceleration trajectory curve defined within the startup acceleration trajectory schedule.

7. The method as in claim 5, further comprising adjusting the first operating point for the parameter to a second operating point based at least in part on the remaining time.

8. The method as in claim 7, wherein adjusting the first operating point for the parameter to the second operating point is based at least in part on an adjustment value, the adjustment value being determined based at least in part from a parameter trajectory schedule provided by an interpolation table.

9. The method as in claim 7, wherein the effector is modified based on the second operating point for the parameter.

10. A system for controlling startup of a gas turbine from applying startup torque to the gas turbine up to full speed, the system comprising:
a monitoring system configured to monitor gas turbine speed and acceleration and to provide gas turbine speed and acceleration signals indicative thereof; and
a control system configured to receive the gas turbine speed and acceleration feedback signals and provide a current speed at a discrete time based thereon, the control system further configured to determine a remaining time for the gas turbine to reach full speed based on the current speed and a target startup time;
wherein the control system is configured to use a startup acceleration trajectory schedule to reach full speed, the trajectory schedule defining a nominal acceleration trajectory curve and a plurality of other acceleration trajectory curves which deviate from the nominal acceleration trajectory curve for achieving full speed from zero speed at the predefined target time;
wherein the controller is configured to compare the current speed and time remaining with the nominal trajectory curve and when the current speed and time remaining deviate from the nominal trajectory curve, and the controller is configured to generate a signal to modify at least one effector of the gas turbine which results in the gas turbine following one of the acceleration trajectory curves which deviate from the nominal acceleration trajectory curve to achieve full speed at the predefined target time.

11. The system as in claim 10, wherein the controller is configured to continuously determine current speed of the gas turbine, time remaining until target startup time and to compare current speed and time remaining with the nominal trajectory curve and the acceleration trajectory curves which deviate from the nominal acceleration trajectory curve.

12. The system as in claim 11, wherein if the current speed and time remaining deviate from a currently chosen acceleration trajectory curve, the controller is configured to generate a signal which modifies at least one effector of the gas turbine which results in the gas turbine following a different trajectory curve to achieve the desired operating speed at the predefined target time.

13. The system as in claim 10, wherein the target startup time is a predefined time for the gas turbine to transition between application of a startup torque to full speed.

14. The system as in claim 10, wherein the effector is at least one of fuel flow or starting torque.

15. The system as in claim 10, wherein the trajectory schedule is an acceleration trajectory schedule.

16. The system as in claim 15, wherein the controller is further configured to compare the current speed and remaining time to at least one of a starting torque schedule and minimum fuel schedule and modify at least one of the at least one effectors based thereon.

* * * * *